(12) United States Patent
Maeno et al.

(10) Patent No.: US 8,368,874 B2
(45) Date of Patent: Feb. 5, 2013

(54) BEAM IRRADIATION DEVICE AND LASER RADAR SYSTEM

(75) Inventors: Yoshiaki Maeno, Mizuho (JP); Atsushi Yamaguchi, Ibi-Gun (JP); Mitsutaka Yamaguchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 451 days.

(21) Appl. No.: 12/695,497

(22) Filed: Jan. 28, 2010

(65) Prior Publication Data

US 2010/0188648 A1    Jul. 29, 2010

(30) Foreign Application Priority Data

Jan. 29, 2009    (JP) .................................. 2009-18734

(51) Int. Cl.
*G01C 3/00*    (2006.01)
(52) U.S. Cl. .................. 356/4.01; 356/3.01; 356/4.1
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS 4,662,750 A * 5/1987 Barger ......................... 356/510

FOREIGN PATENT DOCUMENTS

| JP | 11-83988 A | 3/1999 |
| JP | 2001-290100 A | 10/2001 |

* cited by examiner

*Primary Examiner* — Luke Ratcliffe
(74) *Attorney, Agent, or Firm* — Ditthavong Mori & Steiner, P.C.

(57) ABSTRACT

A beam irradiation device includes: a laser light source for emitting laser light; an actuator which scans a targeted area with the laser light; a servo optical system which changes a propagating direction of servo light in response to driving of the actuator; a photodetector which receives the servo light to output a signal depending on a light receiving position of the servo light; an actuator controlling section which controls the actuator based on the signal to be outputted from the photodetector; and a laser controlling section which controls the laser light source based on the signal to be outputted from the photodetector. The laser controlling section controls the laser light source to emit the laser light in a pulse manner at a timing when the light receiving position of the servo light coincides with a predetermined targeted position.

10 Claims, 15 Drawing Sheets

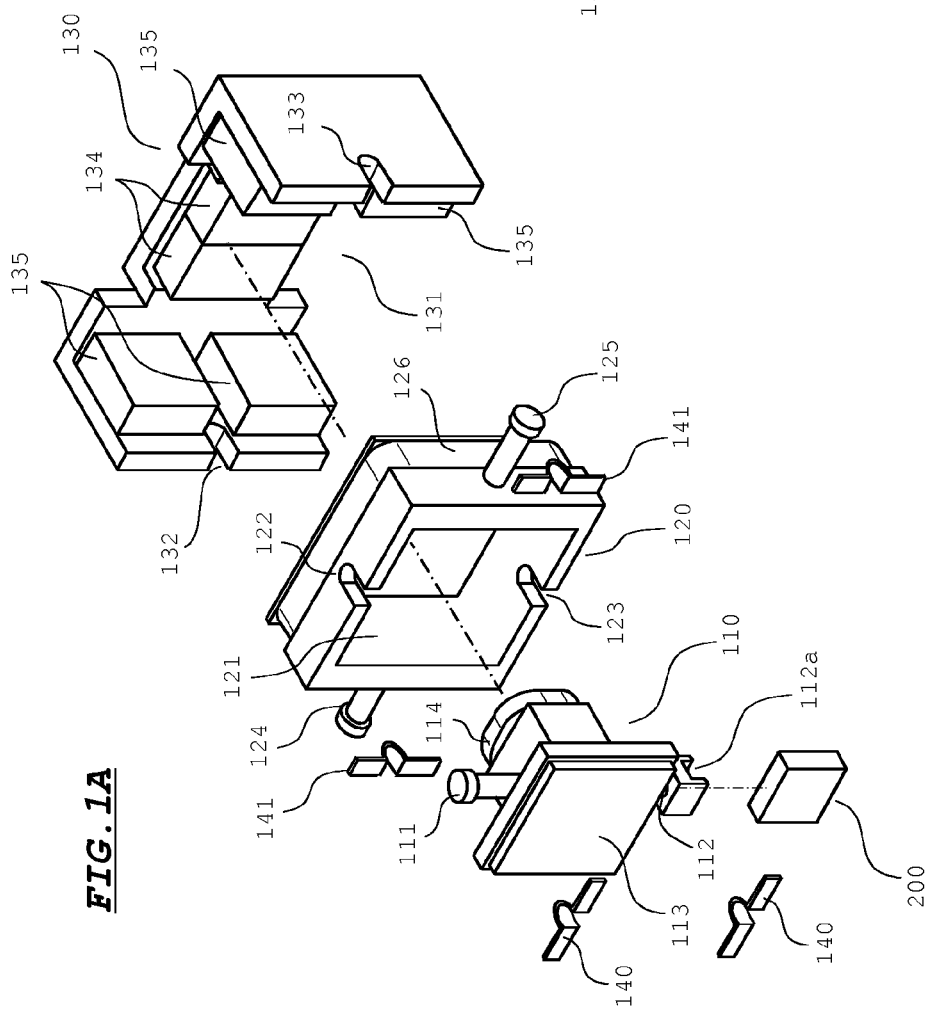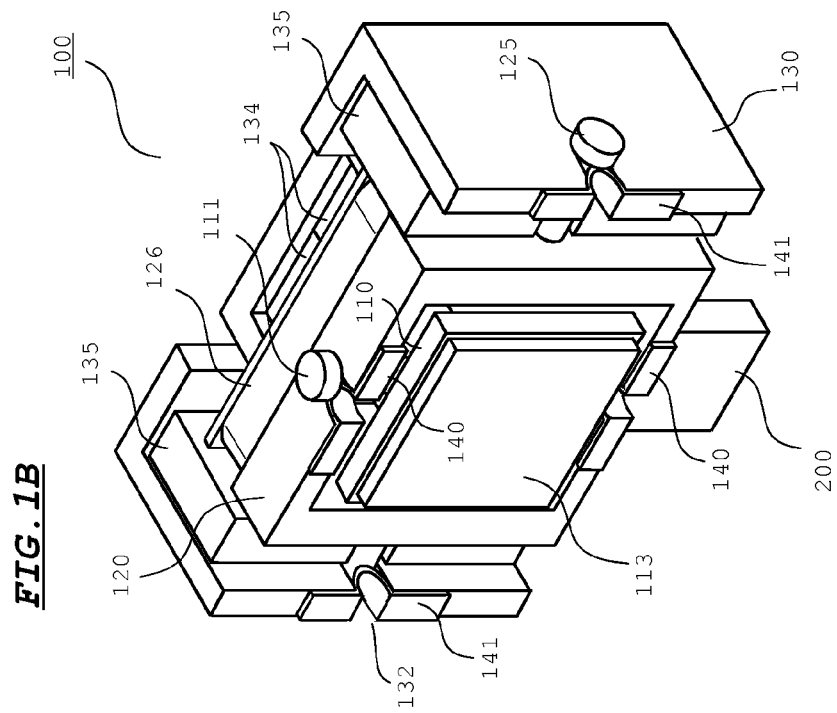

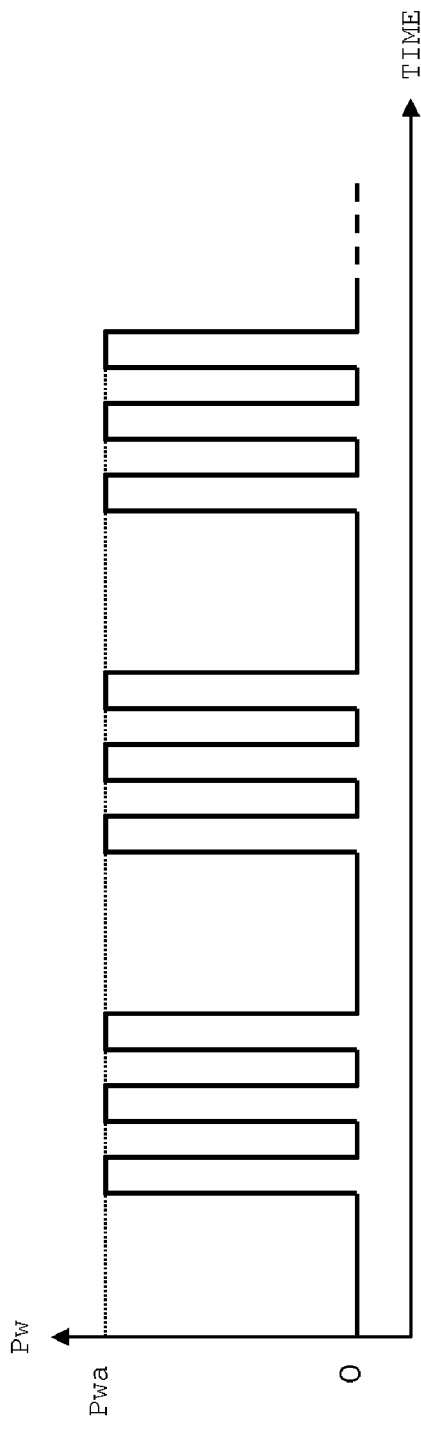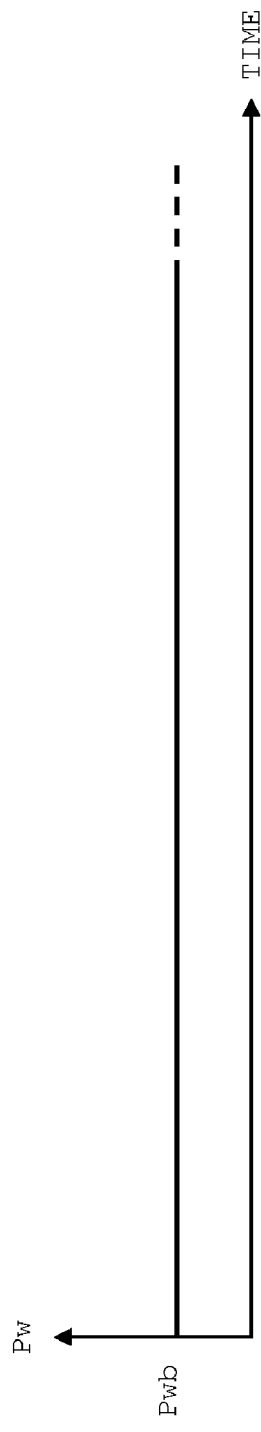
FIG. 7A
FIG. 7B

FIG. 8A

TRAJECTORY TABLE

| CLOCK TIMING | POSITION ON PSD |
|---|---|
| CL1 | P1 |
| CL2 | P2 |
| CL3 | P3 |
| CL4 | P4 |
| CL5 | P5 |
| CL6 | P6 |
| CL7 | P7 |
| CL8 | P8 |
| CL9 | P9 |
| CL10 | P10 |
| ... | ... |

FIG. 8B

MEASUREMENT RESULT

| CLOCK TIMING | POSITION ON PSD |
|---|---|
| CL1 | P1' |
| CL2 | P2' |
| CL3 | P3' |
| CL4 | P4' |
| CL5 | P5' |
| CL6 | P6' |
| CL7 | P7' |
| CL8 | P8' |
| CL9 | P9' |
| CL10 | P10' |
| ... | ... |

BEAM IRRADIATION DEVICE AND LASER RADAR SYSTEM

This application claims priority under 35 U.S.C. Section 119 of Japanese Patent Application No. 2009-18734 filed Jan. 29, 2009, entitled "BEAM IRRADIATION DEVICE AND LASER RADAR SYSTEM". The disclosure of the above application is incorporated herein by reference.

BACKGROUND OF THE INVENTION

1. Field of the Invention

The present invention relates to a beam irradiation device for irradiating laser light onto a targeted area, and more particularly to a beam irradiation device to be loaded in a so-called laser radar system for detecting presence or absence of an obstacle or a distance to the obstacle in a targeted area, based on reflected light obtained by irradiating laser light onto the targeted area.

2. Disclosure of Related Art

In recent years, a laser radar system for irradiating laser light in a forward direction with respect to a driving direction to detect presence or absence of an obstacle or a distance to the obstacle in a targeted area, based on a state of reflected light of the laser light, has been loaded in a family automobile or the like to enhance security in driving. Generally, the laser radar system is so configured as to scan a targeted area with laser light to detect presence or absence of an obstacle at each of scanning positions, based on presence or absence of reflected light at each of the scanning positions. The laser radar system is also configured to detect a distance to the obstacle at each of the scanning positions, based on a required time from an irradiation timing of laser light to a light receiving timing of reflected light at each of the scanning positions.

Heretofore, there has been known scan mechanisms using laser light, such as a scan mechanism incorporated with a polygon mirror, and a scan mechanism incorporated with a scanning lens to be driven two-dimensionally. In addition, there has also been known a scan mechanism incorporated with a pivotal mirror for causing laser light to scan a scanning area.

In the laser radar system incorporated with the scan mechanism, a drive-control operation of a laser light source is performed based on a time elapsed from start of a scanning operation. For instance, laser light is pulse-emitted toward a targeted area at every predetermined time interval from start of a scanning operation.

It is necessary to increase the amount of computation and the number of times of computation operations to be performed by a circuit for controlling the scan mechanism to properly scan a targeted area with laser light. The processing load of a control circuit can be reduced by roughly controlling the scan mechanism. The control, however, fails to properly scan the targeted area with laser light. In this arrangement, if laser light is emitted based on a lapse of time from start of a scanning operation in the above-described manner, the irradiated position of pulse-emitted laser light may be displaced from an intended position, which may deteriorate irradiation precision of laser light with respect to the targeted area.

SUMMARY OF THE INVENTION

In view of the above, an object of the invention is to provide an arrangement that enables to effectively reduce the processing load of an actuator control circuit, while keeping irradiation precision of laser light with respect to a targeted area high by using an output from a photodetector to be used in controlling an actuator for scanning the targeted area with laser light, also for a drive-control operation of a laser light source, as well as for the actuator control.

A first aspect of the invention is directed to a beam irradiation device. The beam irradiation device according to the first aspect includes: a laser light source which emits laser light; an actuator which scans a targeted area with the laser light; a servo optical system which emits servo light, and changes a propagating direction of the servo light in response to driving of the actuator; a photodetector which receives the servo light to output a signal depending on a light receiving position of the servo light; an actuator controlling section which controls the actuator based on the signal to be outputted from the photodetector; and a laser controlling section which controls the laser light source based on the signal to be outputted from the photodetector. The laser controlling section controls the laser light source to emit the laser light in a pulse manner at a timing when the light receiving position of the servo light coincides with a predetermined targeted position.

A second aspect of the invention is directed to a laser radar system. The laser radar system according to the second aspect includes the beam irradiation device according to the first aspect, a reflected light photodetector which receives the laser light reflected from the targeted area, and an obstacle detecting section which detects a status of an obstacle in the targeted area, based on a signal to be outputted from the reflected light photodetector.

BRIEF DESCRIPTION OF THE DRAWINGS

These and other objects, and novel features of the present invention will become more apparent upon reading the following detailed description of the embodiment along with the accompanying drawings.

FIGS. 1A and 1B are diagrams showing an arrangement of a mirror actuator in an embodiment of the present invention.

FIGS. 7A and 7B are diagrams showing an output level of laser light in the embodiment.

FIGS. 8A and 8B are diagrams showing position information to be outputted from the PSD in the embodiment.

Figure 2:
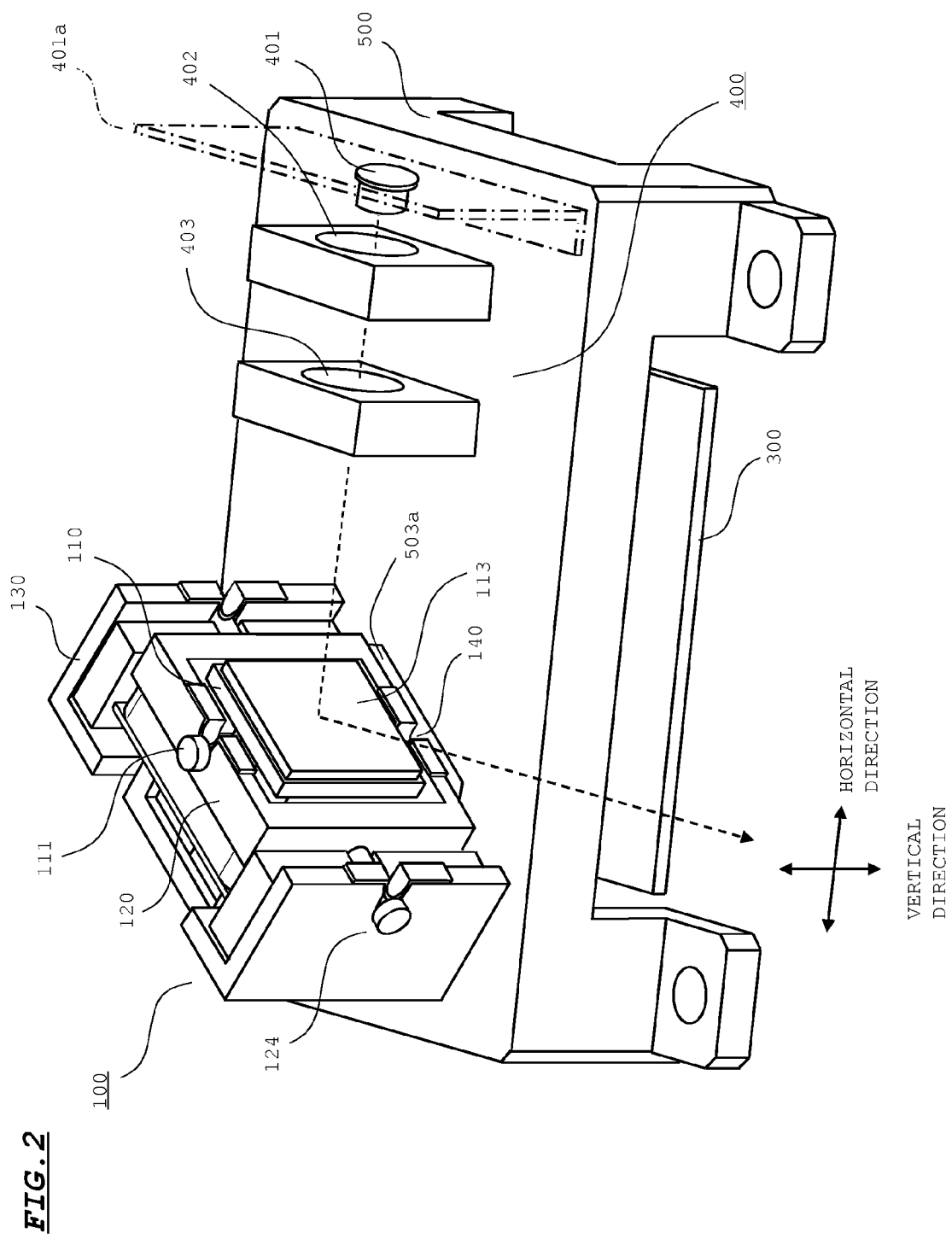
FIG. 2 is a diagram showing an optical system in a beam irradiation device embodying the present invention.

The drawings are provided mainly for describing the present invention, and do not limit the scope of the present invention.

DESCRIPTION OF PREFERRED EMBODIMENTS

FIGS. 1A and 1B are diagrams showing an arrangement of a mirror actuator 100 in an embodiment of the invention. FIG. 1A is an exploded perspective view of the mirror actuator 100, and FIG. 1B is a perspective view of the mirror actuator 100 in an assembled state.

Referring to FIG. 1A, the reference numeral 110 indicates a mirror holder. The mirror holder 110 is formed with a support shaft 111 having a retainer at an end thereof, and a support shaft 112 having a bracket portion 112a at an end thereof. The bracket portion 112a has a recess of a size substantially equal to a thickness of a transparent member 200, and an upper part of the transparent member 200 is mounted in the recess. A flat plate-shaped mirror 113 is mounted on a front surface of the mirror holder 110, and a coil 114 is mounted on a rear surface thereof. The coil 114 is wound in a rectangular shape.

As described above, the transparent member 200 of a parallel flat plate shape is mounted on the support shaft 112 through the bracket portion 112a. In this example, the transparent member 200 is mounted on the support shaft 112 in such a manner that two flat surfaces of the transparent member 200 are aligned in parallel to a mirror surface of the mirror 113.

The reference numeral 120 indicates a movable frame which pivotally supports the mirror holder 110 about axes of the support shafts 111 and 112. The movable frame 120 is formed with an opening 121 for accommodating the mirror holder 110 therein. The movable frame 120 is also formed with grooves 122 and 123 to be engaged with the support shafts 111 and 112 of the mirror holder 110. Support shafts 124 and 125 each having a retainer at an end thereof are formed on side surfaces of the movable frame 120, and a coil 126 is mounted on a rear surface of the movable frame 120. The coil 126 is wound in a rectangular shape.

The reference numeral 130 indicates a fixed frame which pivotally supports the movable frame 120 about axes of the support shafts 124 and 125. The fixed frame 130 is formed with a recess 131 for accommodating the movable frame 120 therein. The fixed frame 130 is also formed with grooves 132 and 133 to be engaged with the support shafts 124 and 125 of the movable frame 120. Magnets 134 for applying a magnetic field to the coil 114, and magnets 135 for applying a magnetic field to the coil 126 are mounted on inner surfaces of the fixed frame 130. The grooves 132 and 133 each extends from a front surface of the fixed frame 130 to a position in a clearance between the upper and lower two magnets 135.

The reference numeral 140 indicates a pressing plate for pressing the support shafts 111 and 112 in a rearward direction to prevent the support shafts 111 and 112 of the mirror holder 110 from disengaging from the grooves 122 and 123 of the movable frame 120. The reference numeral 141 indicates a pressing plate for pressing the support shafts 124 and 125 in the rearward direction to prevent the support shafts 124 and 125 of the movable frame 120 from disengaging from the grooves 132 and 133 of the fixed frame 130.

In the case where the mirror actuator 100 is assembled, the support shafts 111 and 112 of the mirror holder 110 are engaged in the grooves 122 and 123 of the movable frame 120, and the pressing plate 140 is mounted on a front surface of the movable frame 120 in such a manner as to press front surfaces of the support shafts 111 and 112. Accordingly, the mirror holder 110 is pivotally supported on the movable frame 120.

After the mirror holder 110 is mounted on the movable frame 120 in the above-described manner, the support shafts 124 and 125 of the movable frame 120 are engaged in the grooves 132 and 133 of the fixed frame 130, and the pressing plate 141 is mounted on the front surface of the fixed frame 130 in such a manner as to press front surfaces of the support shafts 132 and 133. Accordingly, the movable frame 120 is pivotally mounted on the fixed frame 130. Thus, the mirror actuator 100 is assembled.

As the mirror holder 110 is pivotally rotated with respect to the movable frame 120 about the axes of the support shafts 111 and 112, the mirror 113 is pivotally rotated. Further, as the movable frame 120 is pivotally rotated with respect to the fixed frame 130 about the axes of the support shafts 124 and 125, the mirror holder 110 is pivotally rotated, and as a result, the mirror 113 is pivotally rotated with the mirror holder 110. Thus, the mirror holder 110 is pivotally supported in a two-dimensional direction about the axes of the support shafts 111 and 112, and the support shafts 124 and 125 orthogonal to each other, and the mirror 113 is pivotally rotated in the two-dimensional direction in accordance with the pivotal rotation of the mirror holder 110. During the pivotal rotation, the transparent member 200 mounted on the support shaft 112 is also pivotally rotated in accordance with the pivotal rotation of the mirror 113.

In the assembled state shown in FIG. 1B, the positions and the polarities of the two magnets 134 are adjusted in such a manner that a force for pivotally rotating the mirror holder 110 about the axes of the support shafts 111 and 112 is generated by application of a current to the coil 114. Accordingly, in response to application of a current to the coil 114, the mirror holder 110 is pivotally rotated about the axes of the support shafts 111 and 112 by the electromagnetic driving force generated in the coil 114.

Further, in the assembled state shown in FIG. 1B, the positions and the polarities of the two magnets 135 are adjusted in such a manner that a force for pivotally rotating the movable frame 120 about the axes of the support shafts 124 and 125 is generated by application of a current to the coil 126. Accordingly, in response to application of a current to the coil 126, the movable frame 120 is pivotally rotated about the axes of the support shafts 124 and 125 by the electromagnetic driving force generated in the coil 126, and the transparent member 200 is pivotally rotated in accordance with the pivotal rotation of the movable frame 120.

FIG. 2 is a diagram showing an arrangement of an optical system in a state that the mirror actuator 100 is mounted.

Referring to FIG. 2, the reference numeral 500 indicates a base plate for supporting an optical system. The base plate 500 is formed with an opening 503a at a position where the mirror actuator 100 is installed. The mirror actuator 100 is mounted on the base plate 500 in such a manner that the transparent member 200 is received in the opening 503a.

An optical system 400 for guiding laser light to the mirror 113 is mounted on a top surface of the base plate 500. The optical system 400 includes a laser light source 401, and lens 402 and 403 for beam shaping. The laser light source 401 is mounted on a substrate 401a for a laser light source, and the substrate 401a is provided on the top surface of the base plate 500.

Laser light (hereinafter, called as "scanning laser light") emitted from the laser light source 401 is subjected to convergence in a horizontal direction and a vertical direction by the lenses 402 and 403, respectively. The lenses 402 and 403 are designed in such a manner that the beam shape in a targeted area (e.g. an area defined at a position 100 m away in a forward direction from a beam exit port of a beam irradiation device) has predetermined dimensions (e.g. dimensions of about 2 m in the vertical direction and 1 m in the horizontal direction).

The lens 402 is a cylindrical lens having a lens function in the vertical direction, and the lens 403 is an aspherical lens for emitting scanning laser light as substantially parallel light. A beam emitted from a laser light source has different divergence angles from each other in the vertical direction and the horizontal direction. The first lens 402 changes a ratio between divergence angles of laser light in the vertical direction and the horizontal direction. The second lens 403 changes magnifications of divergence angles (both in the vertical direction and the horizontal direction) of an emitted beam.

Scanning laser light transmitted through the lenses 402 and 403 is entered into the mirror 113 of the mirror actuator 100, and reflected on the mirror 113 toward a targeted area. The targeted area is scanned in the two-dimensional direction with the scanning laser light when the mirror 113 is two-dimensionally driven by the mirror actuator 100.

The mirror actuator 100 is disposed at such a position that scanning laser light from the lens 403 is entered into the mirror surface of the mirror 113 at an incident angle of 45 degrees with respect to the horizontal direction, when the mirror 113 is set to a neutral position. The term "neutral position" indicates a position of the mirror 113, wherein the mirror surface is aligned in parallel to the vertical direction, and scanning laser light is entered into the mirror surface at an incident angle of 45 degrees with respect to the horizontal direction.

A circuit board 300 is provided underneath the base plate 500. Further, circuit boards 301 and 302 are provided on aback surface and a side surface of the base plate 500.

Figure 3B:
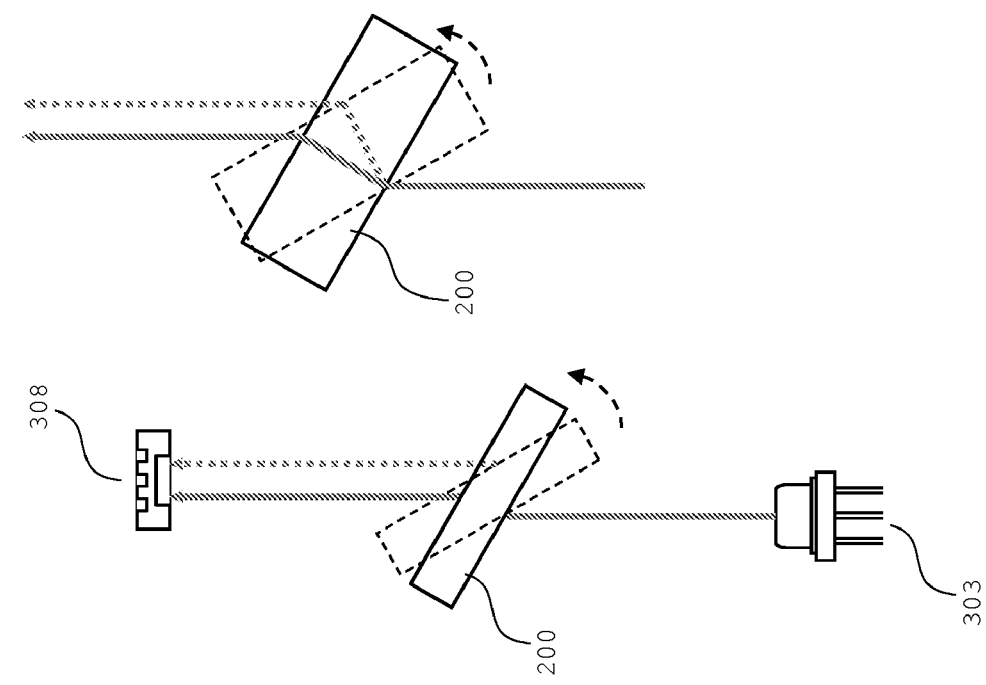
FIGS. 3A and 3B are diagrams showing a servo optical system in the beam irradiation device in the embodiment.
Figure 3A:
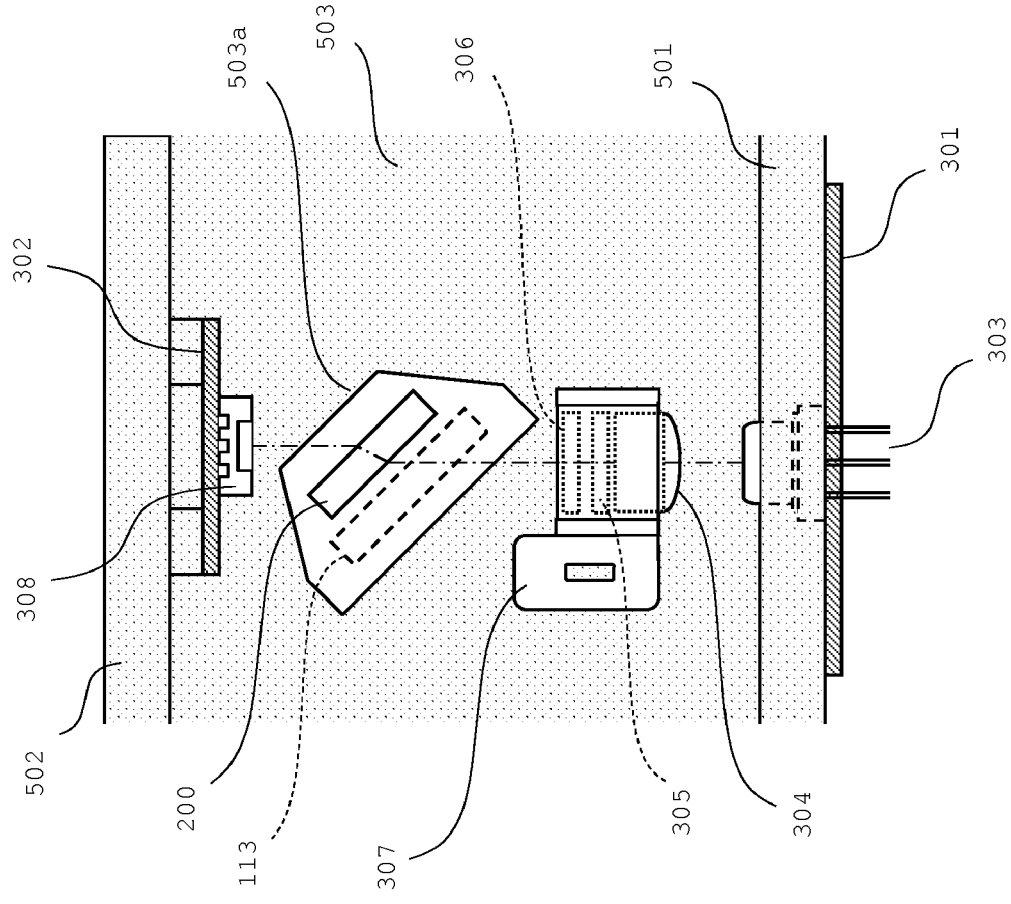

FIG. 3A is a partial plan view of the base plate 500, viewed from the back side of the base plate 500. FIG. 3A shows a part of the back surface of the base plate 500, i.e. a vicinity of the position where the mirror actuator 100 is mounted.

As shown in FIG. 3A, walls 501 and 502 are formed on the periphery of the back surface of the base plate 500. A flat surface 503 lower than the walls 501 and 502 is formed in a middle portion of the back surface of the base plate 500 with respect to the walls 501 and 502. The wall 501 is formed with an opening for receiving a semiconductor laser 303. The circuit board 301 loaded with the semiconductor laser 303 is attached to an outer side surface of the wall 501 in such a manner that the semiconductor laser 303 is received in the opening of the wall 501. Further, the circuit board 302 loaded with a PSD 308 is attached to a position near the wall 502.

A light collecting lens 304, an aperture 305, and a ND (neutral density) filter 306 are mounted on the flat surface 503 on the back surface of the base plate 500 by an attachment member 307. The flat surface 503 is formed with an opening 503a, and the transparent member 200 mounted on the mirror actuator 100 is projected from the back surface of the base plate 500 through the opening 503a. In this example, when the mirror 113 of the mirror actuator 100 is set to the neutral position, the transparent member 200 is set to such a position that the two flat surfaces of the transparent member 200 are aligned in parallel to the vertical direction, and are inclined with respect to an optical axis of emission light from the semiconductor laser 303 by 45 degrees.

Laser light (hereinafter, called as "servo laser light") emitted from the semiconductor laser 303 transmitted through the light collecting lens 304 has the beam diameter thereof reduced by the aperture 305, and has the light intensity thereof reduced by the ND filter 306. Thereafter, the servo laser light is entered into the transparent member 200, and subjected to refraction by the transparent member 200. Thereafter, the servo laser light transmitted through the transparent member 200 is received by the PSD 308, which, in turn, outputs a position detection signal depending on a light receiving position of servo laser light.

FIG. 3B is a diagram schematically showing that a pivotal position of the transparent member 200 is detected by the PSD 308. In FIG. 3B, to simplify the description, only the transparent member 200, the semiconductor laser 303, and the PSD 308 in FIG. 3A are shown.

Servo laser light is refracted by the transparent member 200 inclined with respect to an optical axis of laser light, and received by the photodetector 308. In this example, in the case where the transparent member 200 is pivotally rotated in the direction shown by broken-line arrow in FIG. 3B, the optical path of servo laser light is changed in the manner as shown by the dotted line in FIG. 3B, with the result that the light receiving position of servo laser light on the photodetector 308 is changed. Thus, the pivotal position of the transparent member 200 can be detected by the light receiving position of servo laser light to be detected by the photodetector 308.

Figure 4B:
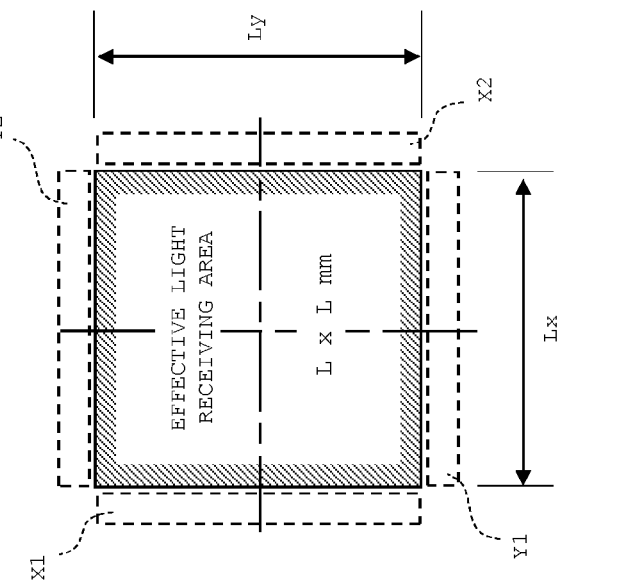
FIGS. 4A and 4B are diagrams showing an arrangement of a PSD in the embodiment.
Figure 4A:
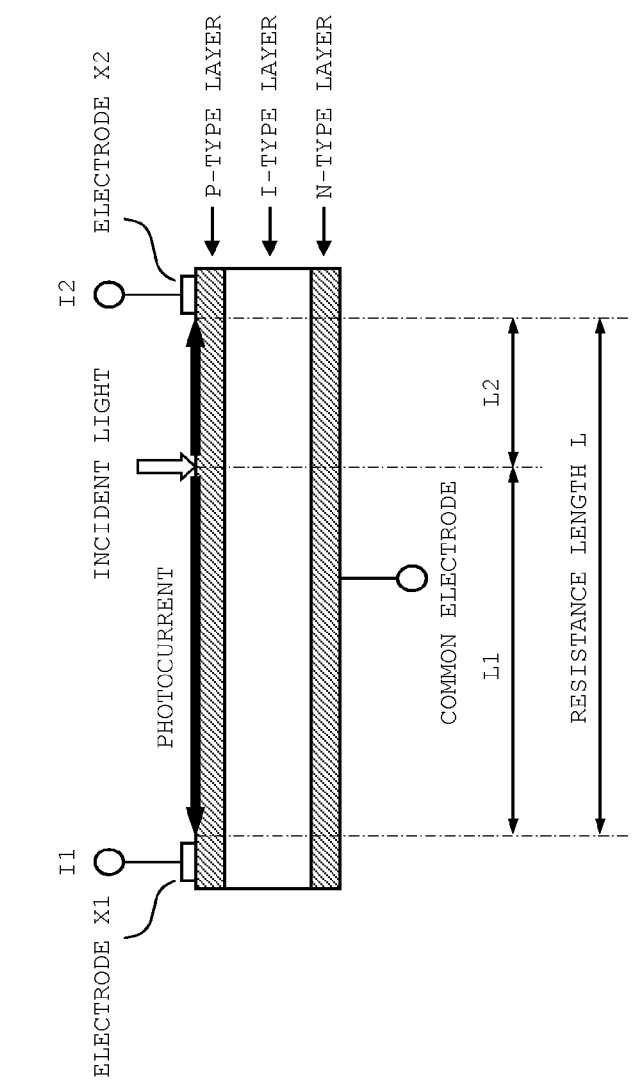

FIG. 4A is a diagram (a side sectional view) showing an arrangement of the PSD 308, and FIG. 4B is a diagram showing a light receiving surface of the PSD 308.

Referring to FIG. 4A, the PSD 308 has such a structure that a P-type resistive layer serving as a light receiving surface and a resistive layer is formed on a surface of an N-type high resistive silicon substrate. Electrodes X1 and X2 for outputting a photocurrent in the horizontal direction on the plane of FIG. 4B, and electrodes Y1 and Y2 (not shown in FIG. 4A) for outputting a photocurrent in the vertical direction on the plane of FIG. 4B are formed on a surface of the resistive layer. A common electrode is formed on the back surface of the substrate.

When laser light is irradiated onto the light receiving surface of the substrate, an electric charge proportional to a light amount is generated at an irradiated position of the light receiving surface. The electric charge is received by the resistive layer as a photocurrent, and the photocurrent is divided in inverse proportion to a distance to the respective corresponding electrodes, and outputted from the electrodes X1, X2, Y1, and Y2. In this example, currents to be outputted from the electrodes X1, X2, Y1, and Y2 each has a magnitude obtained by dividing a photocurrent in inverse proportion to a distance from the laser light irradiated position to the respective corresponding electrodes. Thus, the light irradiated position on the light receiving surface can be detected, based on current values to be outputted from the electrodes X1, X2, Y1, and Y2.

Figure 5B:
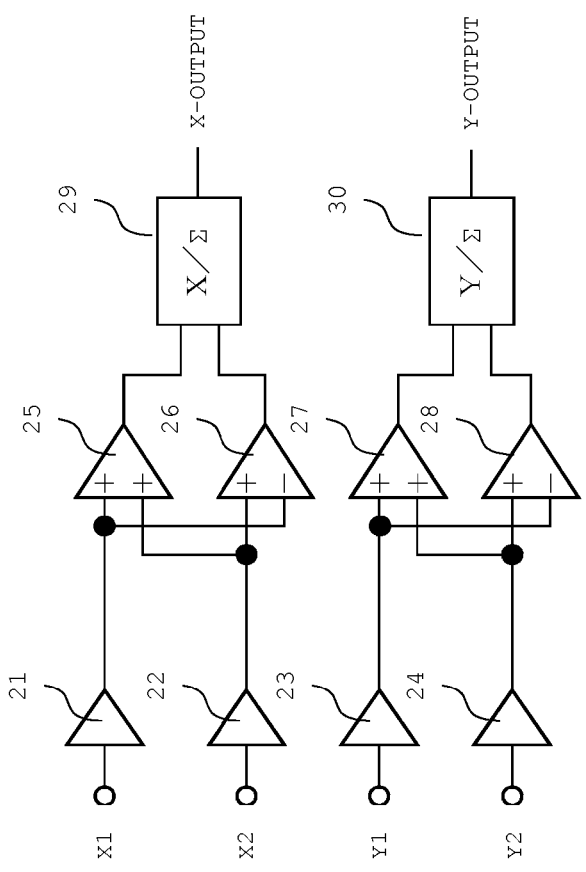
FIGS. 5A and 5B are diagrams for describing a method for generating a position detection signal in the embodiment.
Figure 5A:
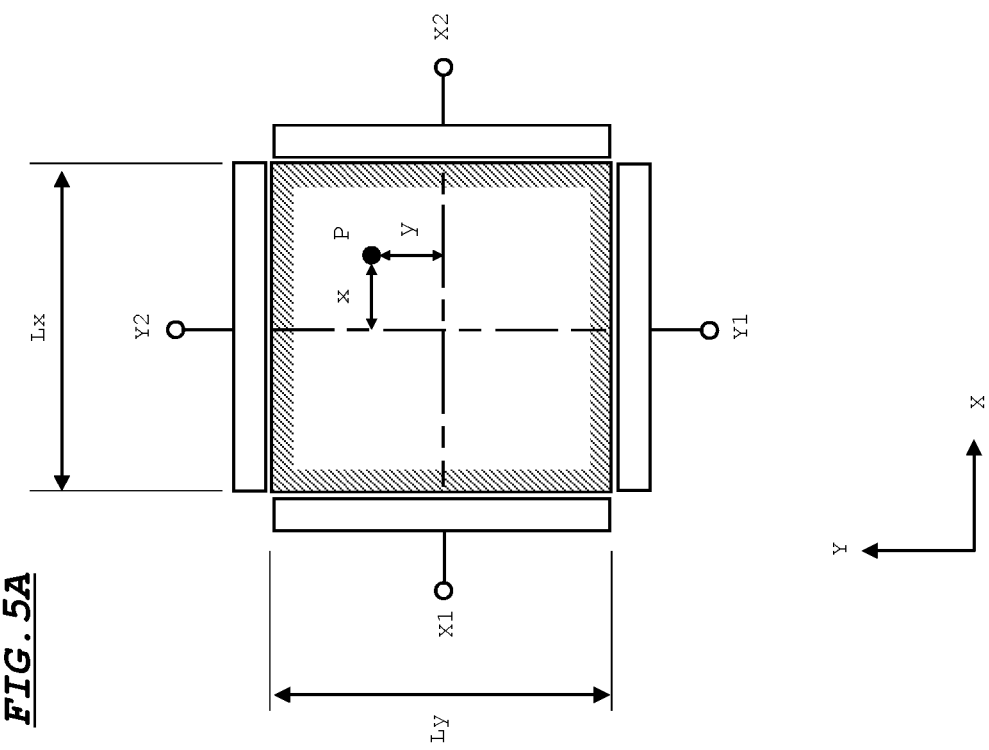

For instance, let it be assumed that servo laser light is irradiated to a position P in FIG. 5A. In this case, a coordinate (x,y) of the position P, with a center position of the light receiving surface being defined as a reference point, is calculated by e.g. the following equations (1) and (2):

$$\frac{Ix2 - Ix1}{Ix2 + Ix1} = \frac{2x}{Lx} \quad (1)$$

$$\frac{Iy2 - Iy1}{Iy2 + Iy1} = \frac{2y}{Ly} \quad (2)$$

where Ix1, Ix2, Iy1, and Iy2 are amounts of current to be outputted from the electrodes X1, X2, Y1, and Y2, respectively, and Lx and Ly are distances between the electrodes in X direction and Y direction, respectively.

FIG. 5B is a diagram showing an arrangement of a computation circuit for realizing the above equations (1) and (2). The current signals Ix1, Ix2, Iy1, and Iy2 to be outputted from the electrodes X1, X2, Y1, and Y2 are amplified by amplifiers 21, 22, 23, and 24, respectively. Then, computations (Ix2+Ix1) and (Iy2+Iy1) are performed by adder circuits 25 and 27, respectively. Then, computations (Ix2−Ix1) and (Iy2−Iy1) are performed by subtraction circuits 26 and 28, respectively. Then, divisions as expressed by the left-hand members of the equations (1) and (2) are performed by divider circuits 29 and 30, respectively. Thus, position detection signals indicating an X-directional position (2x/Lx) and a Y-directional position (2y/Ly) at the light receiving position P of servo laser light are outputted from the divider circuits 29 and 30, respectively.

Figure 6:
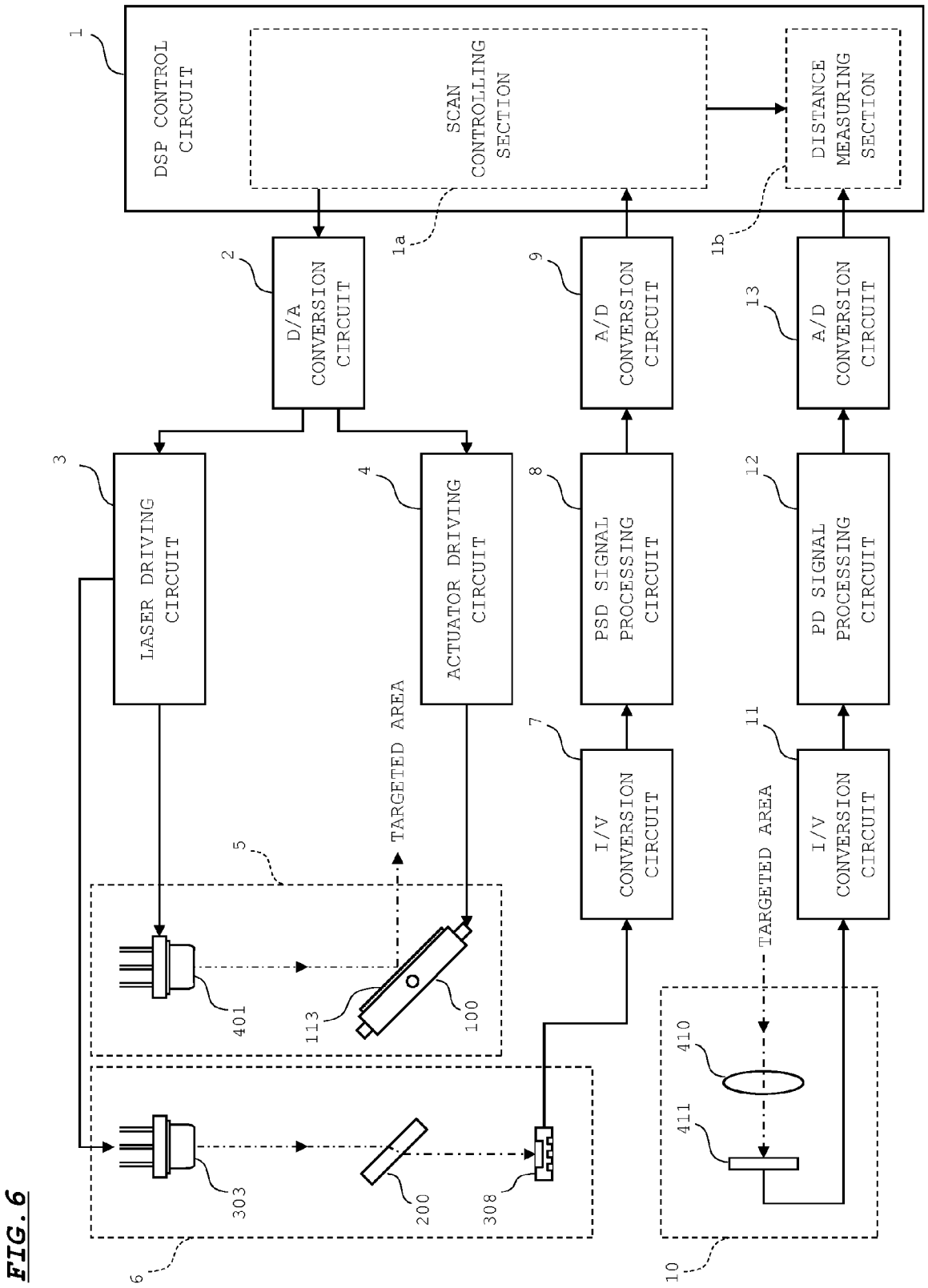
FIG. 6 is a diagram showing a circuit configuration of a laser radar system embodying the present invention.

FIG. 6 is a diagram showing an arrangement of a laser radar system embodying the invention. As shown in FIG. 6, the laser radar system includes a DSP (Digital Signal Processor) control circuit 1, a D/A conversion circuit 2, a laser driving circuit 3, an actuator driving circuit 4, a scanning optical system 5, a servo optical system 6, an I/V conversion circuit 7, a PSD signal processing circuit 8, an A/D conversion circuit 9, a light receiving optical system 10, an I/V conversion circuit 11, a PD (Photo Detector) signal processing circuit 12, and an A/D conversion circuit 13.

The scanning optical system 5 has the optical system shown in FIG. 2, and the servo optical system 6 has the optical system shown in FIG. 3A. To simplify the description, only the laser light source 401, the mirror actuator 100, and the mirror 113 are shown as parts of the scanning optical system 5 in FIG. 6. Likewise, to simplify the description, only the semiconductor laser 303, the transparent member 200, and the PSD 308 are shown as parts of the servo optical system 6 in FIG. 6.

The DSP control circuit 1 outputs, to the D/A conversion circuit 2, a digital signal for drive-controlling the laser driving circuit 3 and the actuator driving circuit 4. The DSP control circuit 1 also detects a position of an obstacle and a distance to the obstacle in a scanning area, based on a digital signal to be inputted from the A/D conversion circuit 13.

The DSP control circuit 1 has a clock generating section (not shown), a scan controlling section 1a, and a distance measuring section 1b. The clock generating section outputs a clock of a high frequency.

The scan controlling section 1a generates a control signal for controlling the mirror actuator 100, and supplies the control signal to the actuator controlling circuit 4 through the D/A conversion circuit 2. Accordingly, the scanning area is scanned in the two-dimensional direction with the scanning laser light. The sequence of controlling the mirror actuator 100 is described later referring to FIG. 8.

As will be described later, the scan controlling section 1a drives the laser driving circuit 3 through the D/A conversion circuit 2, based on a light receiving signal to be inputted from the A/D conversion circuit 9 to control outputs from the laser light source 401 and the semiconductor laser 303.

As will be described later, the distance measuring section 1b measures a distance to an obstacle, based on a light receiving signal to be inputted from the A/D conversion circuit 13, and a clock.

The D/A conversion circuit 2 converts a digital signal inputted from the DSP control circuit 1 into an analog signal to output the analog signal to the laser driving circuit 3 and the actuator driving circuit 4. The laser driving circuit 3 drives the laser light source 401 in the scanning optical system 5, and the semiconductor laser 303 in the servo optical system 6 in accordance with a control signal inputted from the D/A conversion circuit 2. The actuator driving circuit 4 drives the mirror actuator 100 in the scanning optical system 5 in accordance with a control signal inputted from the D/A conversion circuit 2.

Scanning laser light emitted from the laser light source 401 is entered into the mirror 113 supported on the mirror actuator 100 in the scanning optical system 5. As described above, the mirror 113 is pivotally supported by the mirror actuator 100 about the axes of the two shafts. Further, the mirror 113 reflects the scanning laser light received thereon toward the scanning area.

As described above, servo laser light emitted from the semiconductor laser 303 in the servo optical system 6 is refracted by the transparent member 200, and then entered into the light receiving surface of the PSD 308. Accordingly, current signals (current signals to be outputted from the electrodes X1, X2, Y1, and Y2 in FIG. 5A) depending on the light receiving position of servo laser light are inputted to the I/V conversion circuit 7.

The I/V conversion circuit 7 converts the inputted current signals into voltage signals, and outputs the voltage signals to the PSD signal processing circuit 8. The PSD signal processing circuit 8 generates signals indicating the light receiving position of servo laser light based on the inputted voltage signals by performing the computations described referring to FIG. 5B, and outputs the signals to the A/D conversion circuit 9. In FIG. 5B, the computations are performed based on current values. In the arrangement shown in FIG. 6, current values from the respective electrodes are converted into voltage values, and signals indicating the light receiving position are generated based on the voltage values after conversion by performing computations substantially equivalent to the computations described referring to FIG. 5B. The A/D conversion circuit 9 converts the inputted voltage signals into digital signals, and outputs the digital signals to the scan controlling section 1a in the DSP control circuit 1.

The light receiving optical system 10 has a light collecting lens 410 and a PD 411. The light collecting lens 410 collects scanning laser light reflected on the obstacle in the scanning area, and guides the reflected scanning laser light to the PD 411. The PD 411 receives the laser light collected by the light collecting lens 410, and outputs a current signal of a magnitude depending on a light receiving amount of the laser light to the I/V conversion circuit 11.

The I/V conversion circuit 11 converts the inputted current signal into a voltage signal, and outputs the voltage signal to the PD signal processing circuit 12. The PD signal processing circuit 12 amplifies the voltage signal inputted from the I/V conversion circuit 11, removes noises, and outputs the amplified voltage signal to the A/D conversion circuit 13. The A/D conversion circuit 13 converts the inputted signal into a digital signal, and outputs the digital signal to the distance measuring section 1b.

Next, a sequence of measuring a distance to the obstacle in the scanning area is described.

The scan controlling section 1a outputs, to the laser driving circuit 3 through the D/A conversion circuit 2, a signal for driving the semiconductor laser 303 (a servo laser) to constantly emit light with a power level Pwb in scanning the scanning area with the scanning laser light. Simultaneously in performing the above operation, the output from the laser light source 401 (a scan laser) is changed in a pulse manner for a predetermined time at a predetermined timing. Specifically, the scan controlling section 1a outputs, to the laser driving circuit 3 through the D/A conversion circuit 2, a signal for raising the output level of the laser light source 401 from zero to a level Pwa at a predetermined timing. The level Pwa is set to a level capable of smoothly detecting an obstacle and a distance to the obstacle.

Referring to FIG. 7A, the output from the laser light source 401 is raised from zero to the level Pwa at a predetermined timing in a pulse manner. Accordingly, the scanning laser light is emitted in a pulse manner at a predetermined timing, while scanning the scanning area. Referring to FIG. 7B, the output level of the semiconductor laser 303 is kept at the level Pwb without depending on the timing of pulse emission of the laser light source 401.

Referring back to FIG. 6, the distance measuring section 1$b$ detects a light receiving timing of reflected light, based on a digital signal inputted from the A/D conversion circuit 13, and detects a distance to the obstacle at a scanning position, based on the light receiving timing, and a timing of pulse emission of scanning laser light to be inputted from the scan controlling section 1$a$.

Specifically, the number N of clocks to be outputted from the clock generating section in the DSP control circuit 1 is counted between the timing of pulse emission to be outputted at each of the scanning positions and the light receiving timing of reflected light at each of the scanning positions. Then, presence or absence of an obstacle, and the distance L to the obstacle at each of the scanning positions are detected, based on the counted number N of clocks. For instance, the distance to the obstacle is detected by computing an equation: $L=C$ (light velocity)$\times T \times N/2$, where T is a cycle of a clock. In the case where it is impossible to receive reflected light within a predetermined time, it is judged that there exists no obstacle at the scanning position.

Next, a sequence of controlling the mirror actuator 100 is described. In this embodiment, the PSD 308 is disposed at such a position that in response to pivotal rotation of the mirror 113 in the horizontal direction from the neutral position, servo laser light is shifted in X-axis direction (a direction along which the electrodes X1 and X2 are arranged) in FIG. 5A from the middle on the light receiving surface shown in FIG. 5A.

FIG. 8A is a diagram showing a trajectory table to be referred to in scanning the scanning area with scanning laser light. In the trajectory table, trajectories of servo laser light in properly scanning the scanning area with scanning laser light are described. Specifically, proper light receiving positions (hereinafter, called as "proper values") (P1, P2, ... ) of servo laser light on the PSD 308 at respective corresponding clock timings (CL1, CL2, ... ) during a scanning operation are held in the trajectory table. In this example, the proper values (P1, P2, ... ) are defined in such a manner as to describe a behavior of servo light when the scanning laser light scans the scanning area horizontally with a predetermined angular velocity. The trajectory table is stored in a memory (not shown in FIG. 6) provided in the DSP control circuit 1. The clock timings are generated by frequency-dividing a clock to be outputted from the clock generating section in the DSP control circuit 1.

FIG. 8B is a diagram showing actual measurement values (P1', P2', ... ) of the light receiving position of servo laser light on the PSD 308 at the respective corresponding clock timings when the scanning laser light scans the scanning area under the servo control in accordance with the trajectory table.

Figure 9:
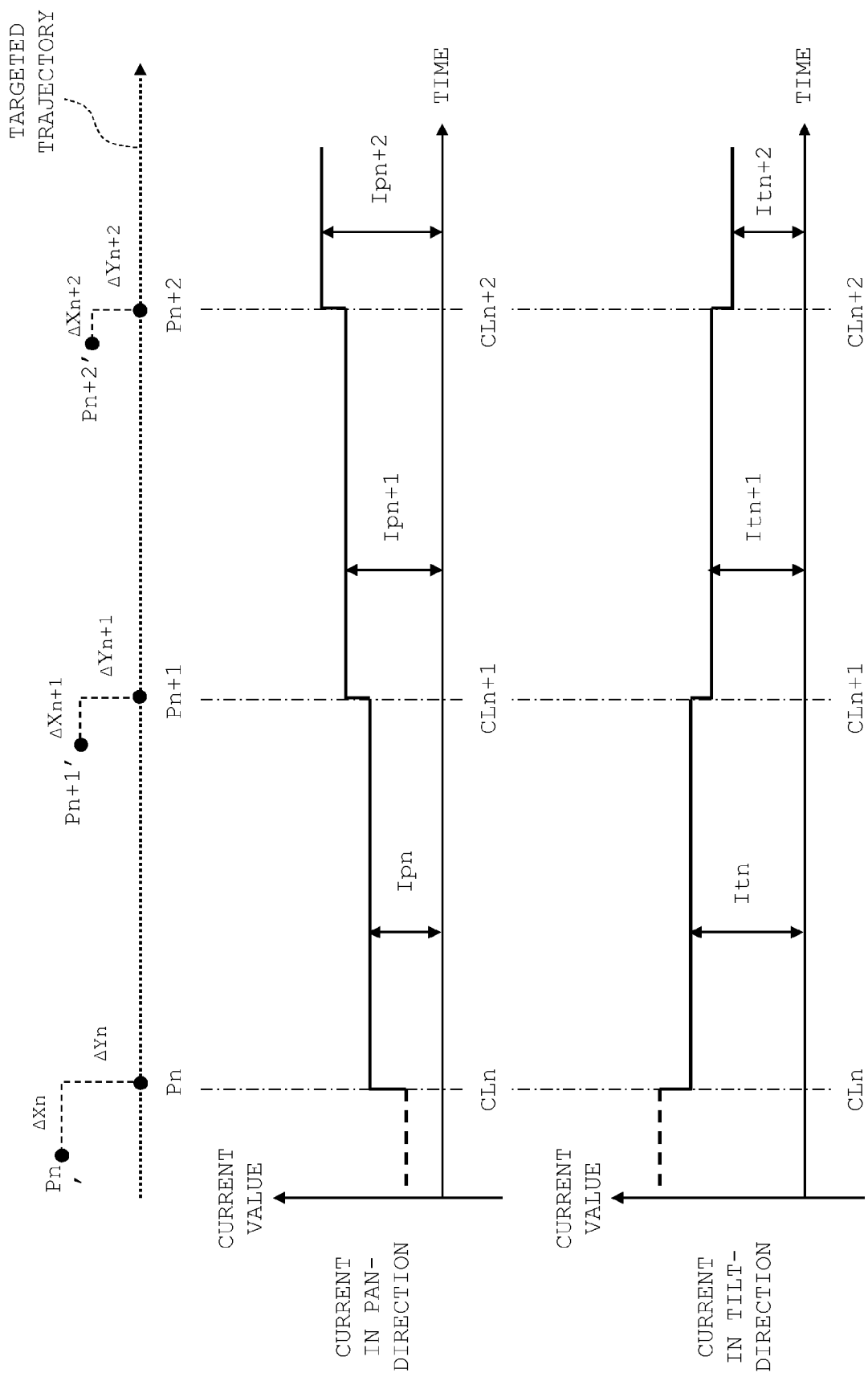
FIG. 9 is a diagram for describing a scan-control operation in the embodiment.

FIG. 9 is a diagram for describing a servo-control operation to be performed by the mirror actuator 100 based on the trajectory table.

Pn represents a proper value of servo laser light in correspondence to the clock timing CLn in the trajectory table. Pn' represents an actual measurement value of the light receiving position of servo laser light at the clock timing CLn. $\Delta$Xn and $\Delta$Yn respectively represent positional displacements of Pn' with respect to Pn in X axis direction and Y axis direction in FIG. 5A. Ipn and Itn respectively represent current values with which the mirror actuator 100 is to be driven in Pan-direction (horizontal direction) and Tilt-direction (vertical direction) during a time period between the clock timing CLn and the succeeding clock timing CLn+1. Currents of the current values in Pan-direction and Tilt-direction are respectively applied to the coil 114 and the coil 126 shown in FIG. 1A. FIG. 9 shows a period from the clock timing CLn through the clock timing CLn+2.

Referring to FIG. 9 in combination with FIG. 6, the scan controlling section 1$a$ compares the actual measurement value Pn' of the light receiving position of servo laser light to be inputted from the A/D conversion circuit 9 at the clock timing CLn, with the proper value Pn described in the trajectory table. As a result of the comparison, it is judged that Pn' is displaced with respect to Pn in X axis direction and Y axis direction in FIG. 5A by $\Delta$Xn and $\Delta$Yn, respectively.

Then, the scan controlling section 1$a$ calculates current values Ipn+1 and Itn+1 of currents to be applied to the actuator driving circuit 4 at the succeeding clock timing CLn+1 in a period before the succeeding clock timing CLn+1 to make the positional displacements $\Delta$Xn and $\Delta$Yn to zero. Specifically, the scan controlling section 1$a$ applies a current of the current value Ipn+1 to the coil 114 of the mirror actuator 100 in Pan-direction, and applies a current of the current value Itn+1 to the coil 126 of the mirror actuator 110 in Tilt-direction at the succeeding clock timing CLn+1 so that the actual measurement value of the light receiving position of servo laser light lies in the trajectory range described in the trajectory table. The control of adjusting the current values may be performed by PID control.

The above arrangement enables to suppress positional displacements $\Delta$Xn+2 and $\Delta$Yn+2 of an actual measurement value at the succeeding clock timing CLn+2, as compared with a positional displacement at the clock timing CLn+1. Controlling the mirror actuator 100 at the clock timing CL+2 based on a displacement between an actual measurement value Pn+1' and a proper value Pn+1 at the clock timing CLn+1 in the similar manner as described above enables to further improve a positional displacement of an actual measurement value at a succeeding clock timing.

As described above, in response to a drive-control operation (hereinafter, called as a "scan-control operation") of the mirror actuator 100 based on servo laser light, the scanning laser light is controlled to successively and properly scan the scanning area.

Scanning precision of scanning laser light is increased by reducing the interval of clock timings, and finely adjusting the current value in Pan-direction and the current value in Tilt-direction. In other words, fine adjustment enables to scan the scanning area in the horizontal direction with scanning laser light at a predetermined angular velocity without displacement. Fine adjustment, however, increases the processing load of the scan controlling section 1$a$ for computing the current values.

Figure 10B:
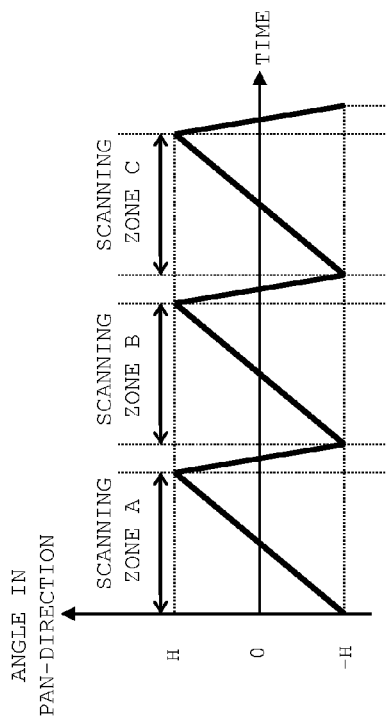
FIGS. 10A through 10D are diagrams showing that laser light properly scans a scanning area in the embodiment.
Figure 10C:
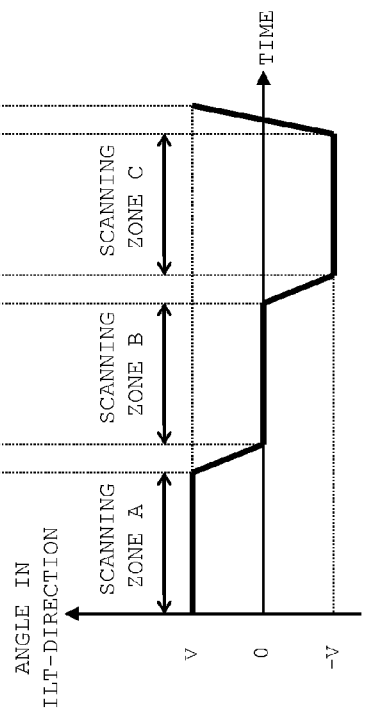
Figure 10A:
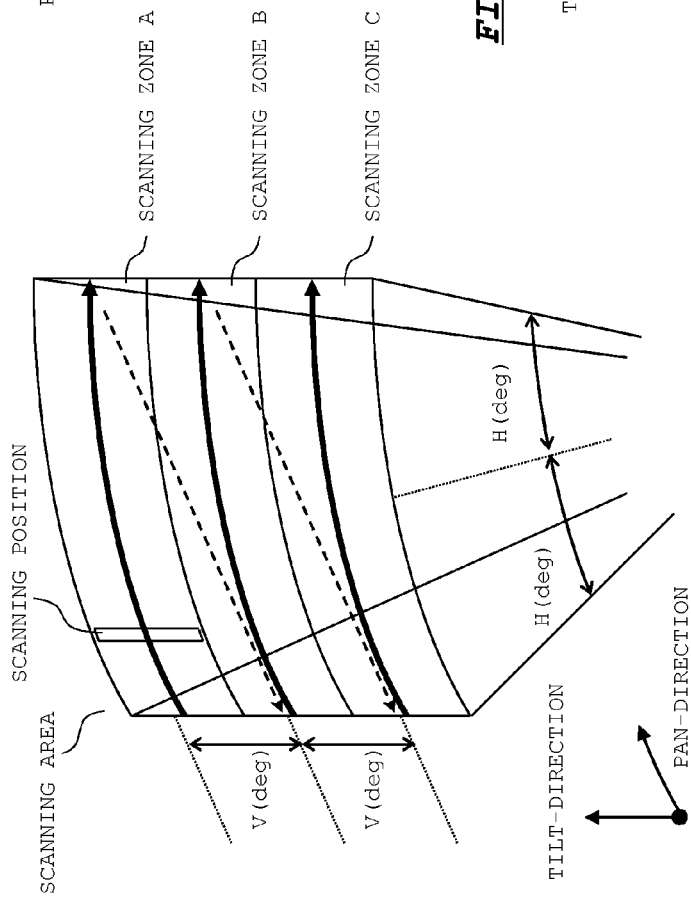
Figure 10D:
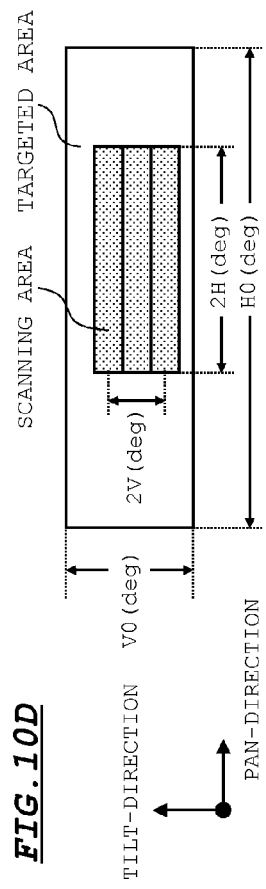

FIGS. 10A through 10D are diagrams showing scan states by scanning laser light when the mirror actuator 100 is properly (idealistically) driven for a scan-control operation. FIG. 10A is a perspective view of a scanning area to be scanned by scanning laser light. FIGS. 10B and 10C are diagrams showing a change in swing angle of scanning laser light in Pan-direction and Tilt-direction in the case where the scanning area is scanned with scanning laser light. FIG. 10D is a diagram showing a relation between a scanning area and a targeted area.

Referring to FIG. 10A, the scanning area has an angle range of 2H (deg) in Pan-direction, and an angle range of 2V (deg) in Tilt-direction. Specifically, assuming that the center of a scan width in Pan-direction and Tilt-direction is set to zero (deg), the scanning position by scanning laser light is changed from −H (deg) to H (deg) in Pan-direction, and from −V (deg) to V (deg) in Tilt-direction. Further, the scanning area is divided into scanning zones "A", "B", and "C" in Tilt-direction, and the scanning laser light scans the scanning area in the order of the scanning zones "A", "B", and "C" in Pan-direction.

Referring to FIG. 10B, the angular velocity of scanning laser light in Pan-direction is made constant between the scanning zones. Referring to FIG. 10C, the angle of scanning laser light in Tilt-direction is made constant between the scanning zones.

Referring to FIG. 10D, the targeted area has a width of H0 (deg) in Pan-direction, and a width of V0 (deg) in Tilt-direction. Further, the targeted area is defined in such a manner as to cover an area which is required to be scanned. The scanning area is set to lie within the targeted area, and is optionally set within the targeted area depending on the position of an object to be scanned. Thus, setting the scanning area as apart of the targeted area enables to maximally suppress a required time and a required computation amount per scanning operation.

The trajectory table shown in FIG. 8A is prepared individually with respect to each of the scanning zones "A", "B", and "C". The trajectory tables are prepared based on the premise that the scanning area is allocated in the middle of the targeted area. If the scanning area is displaced from the middle of the targeted area, proper positions (P1, P2, . . . ) in each of the trajectory tables are corrected depending on the displacement, and the aforementioned scan-control operation is performed, based on the corrected trajectory tables.

Figure 11A:
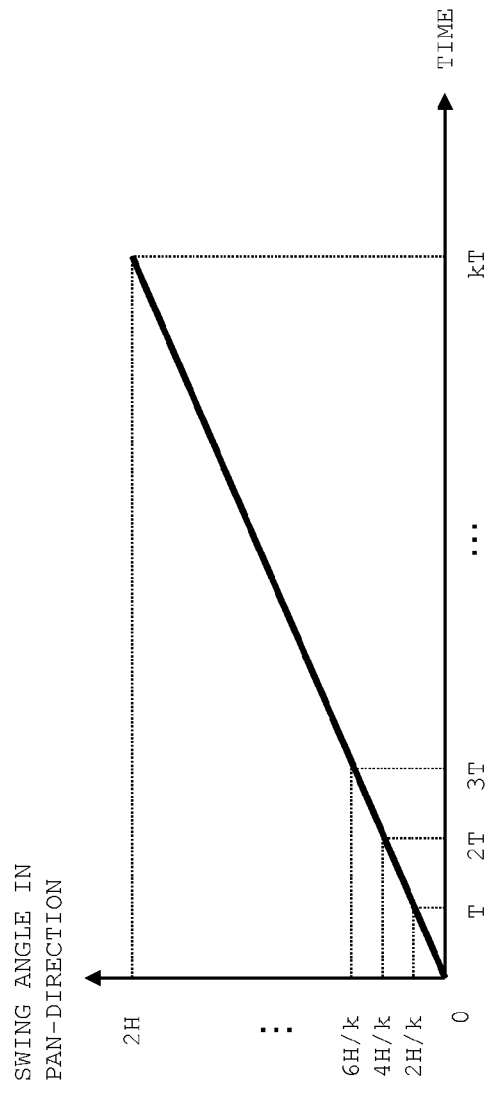
FIGS. 11A and 11B are diagrams for describing a position of pulse emission in the embodiment.

FIG. 11A is a diagram showing a relation between a time, and a swing angle of scanning laser light in Pan-direction, in the case where the scanning laser light properly (idealistically) scans the scanning area, as shown in FIGS. 10A through 10C. In FIG. 11A, the axis of abscissas indicates an elapsed time, and the axis of ordinate indicates a swing angle of scanning laser light in Pan-direction in any one of the scanning zones "A", "B", and "C", assuming that the scan start position (the left end in the horizontal direction in FIG. 11A) is set to zero (deg).

Figure 11B:
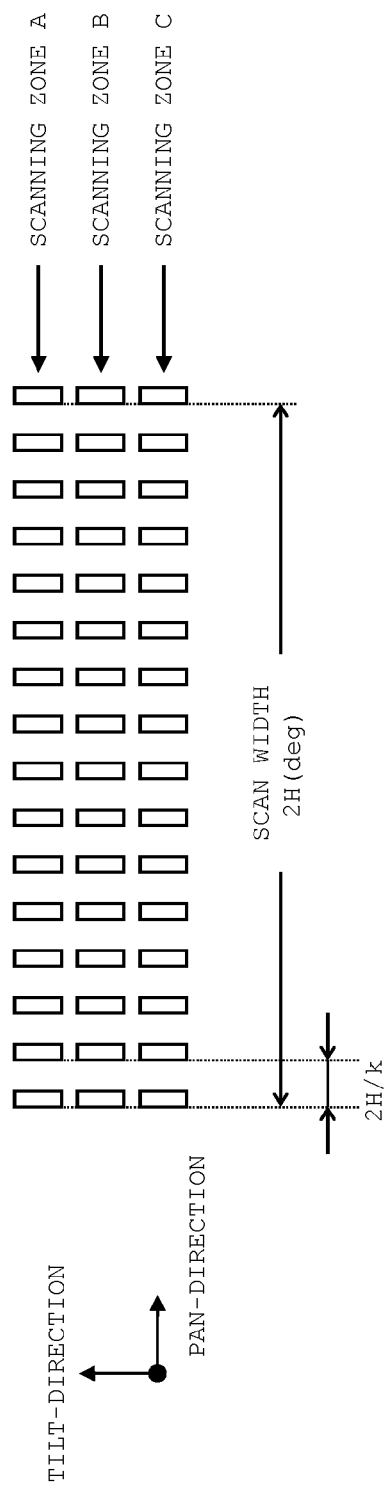

In the above arrangement, as described above, the swing angle in Pan-direction is linearly changed with time. Accordingly, if the scanning laser light is pulse-emitted at a predetermined cycle T, the scanning laser light is irradiated onto the scanning area at every predetermined angle. FIG. 11B is a diagram showing an irradiation angle position of scanning laser light within the scanning area (hereinafter, called as a "scanning position"), in the case where the scanning laser light is pulse-emitted at a predetermined cycle. In FIG. 11B, the scanning position is indicated by a rectangular shape with a longer side in the vertical direction.

As described above, in the case where the mirror actuator 100 is properly (idealistically) controlled, and as a result, the scanning laser light properly (idealistically) scans the scanning area, the scanning laser light can be irradiated onto the scanning area at an equal angular interval by pulse-emitting the scanning laser light at a predetermined cycle. However, in order to properly (idealistically) control the mirror actuator 100 as described above, it is necessary to strictly control the mirror actuator 100 in Pan-direction and Tilt-direction in such a manner that the scanning position in Pan-direction is shifted with a constant speed, and the scanning position in Tilt-direction is unchanged in each of the scanning zones. Specifically, it is necessary to set the time interval of clock timings at which the scan-control operation is performed to a small value, as described above.

However, if the time interval of clock timings is reduced, it is necessary to increase the number of times of computing current values of currents to be applied to the coils in Pan-direction and Tilt-direction. It is also necessary to reduce a time required for performing the computations. Thus, there occurs a problem that the processing load of the scan controlling section 1a is increased.

Figure 12:
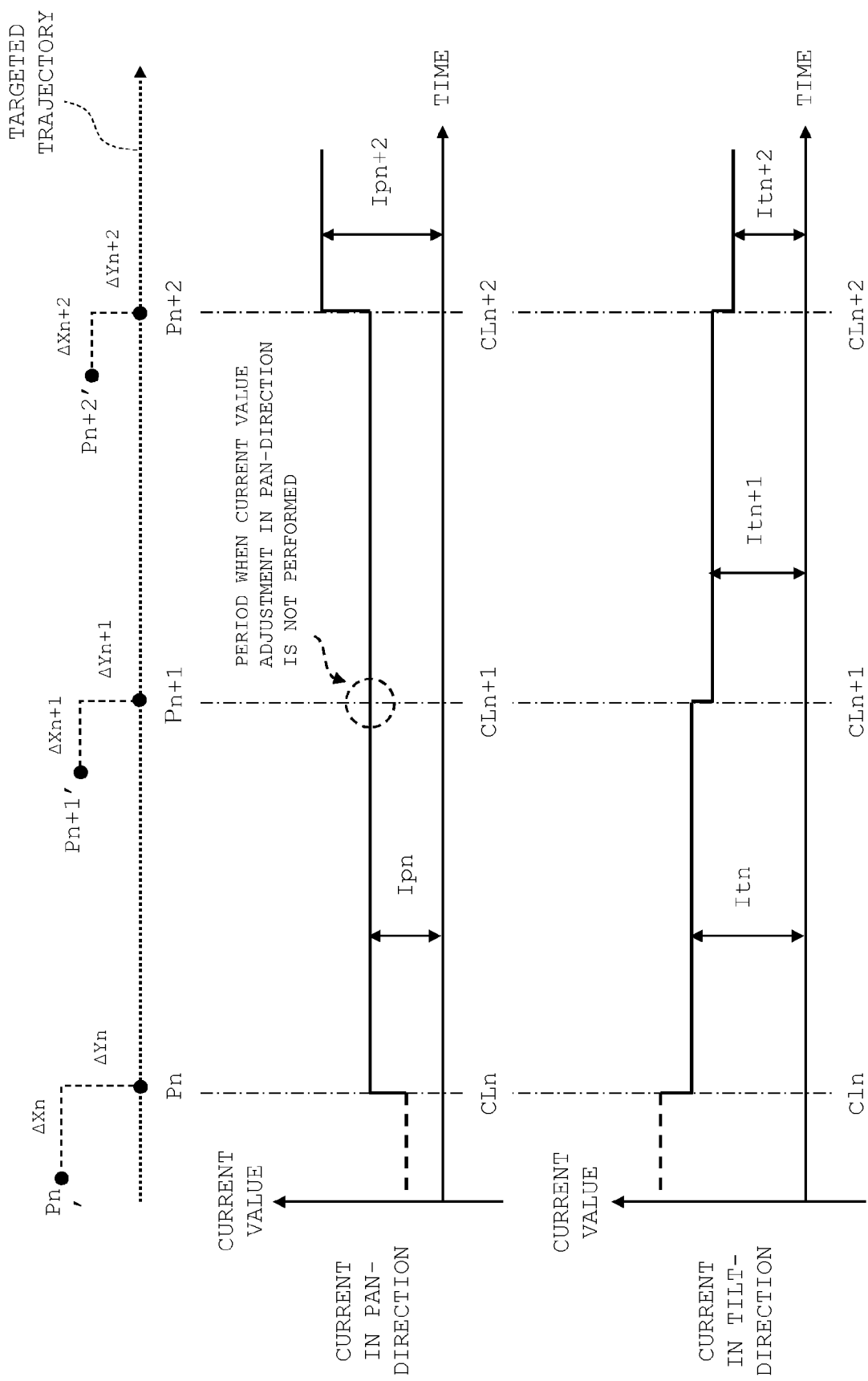
FIG. 12 is a diagram for describing a modified scan-control operation in the embodiment.

FIG. 12 is a diagram showing a state as to how a current value is set, in the case where the number of times of performing a scan-control operation in Pan-direction is reduced to one-half of that in FIG. 9.

As shown in FIG. 12, after a current of the current value Ipn is applied to the coil 111 in Pan-direction at the clock timing CLn, the current of the current value Ipn is kept being applied to the coil 111 in Pan-direction at the clock timing CLn+1, without adjusting the current value in Pan-direction. Specifically, at the clock timing CLn+1, there is no setting of the current value Ipn+1, based on a difference ΔXn between the actual measurement value Pn' of the light receiving position of servo laser light, and the proper value Pn. In this example, the current value Ipn+2 at the clock timing CLn+2 is set, using the difference ΔXn.

The above arrangement enables to reduce computation load on the scan controlling section 1a in performing a scan-control operation in Pan-direction. However, in the case where the number of times of performing a scan-control operation in Pan-direction is reduced as described above, the position of the actual measurement value Pn+2' in Pan-direction is away from the proper value Pn+2, as compared with a case that the current value adjustment in Pan-direction is performed at the clock timing CLn+1. Similarly to the arrangement shown in FIG. 9, the current value adjustment in Tilt-direction is performed at each of the clock timings. Accordingly, positional displacement of servo laser light in Tilt-direction is suppressed substantially in the same manner as in the arrangement shown in FIG. 9.

Figure 13A:
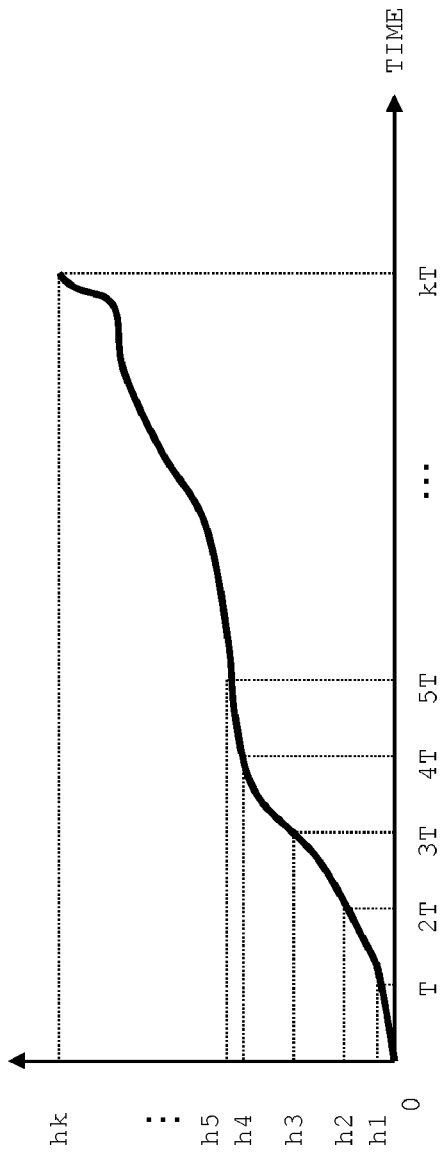
FIGS. 13A and 13B are diagrams for describing the position of pulse emission in the embodiment.
Figure 13B:
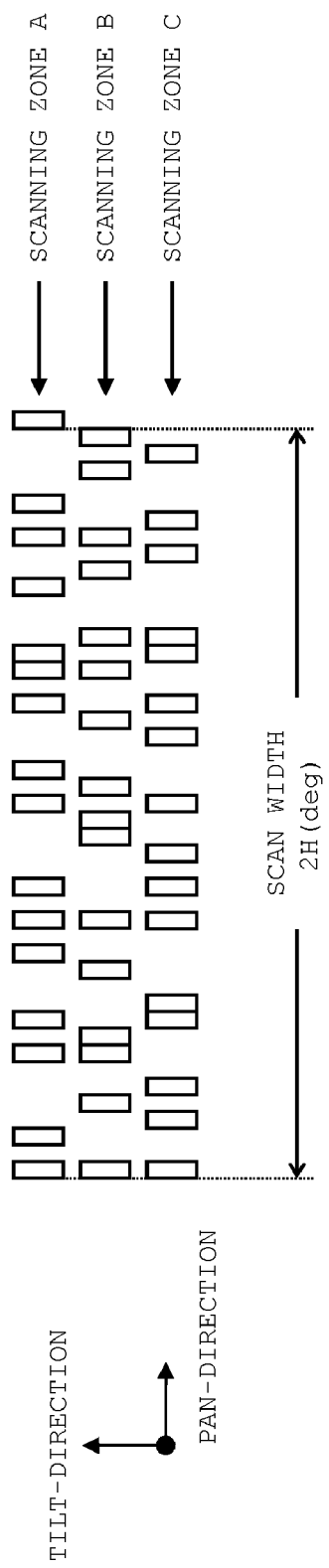

FIG. 13A is a diagram schematically showing a relation between a time, and a swing angle of scanning laser light in Pan-direction, in the case where a scan-control operation as shown in FIG. 12 is performed. In this arrangement, as shown in FIG. 13A, the swing angle in Pan-direction is not linearly changed with time. Accordingly, if the scanning laser light is pulse-emitted at a predetermined cycle T, as shown in FIG. 13B, the scanning laser light is irradiated onto the scanning area in a non-uniform manner in Pan-direction.

As described above, if the number of times of performing a scan-control operation in Pan-direction is reduced, the scanning positions in Pan-direction are not set at equal distant. Accordingly, in the case where scanning laser light is pulse-emitted at a predetermined cycle in the above state, there occurs a drawback that a blank area where scanning laser light is not irradiated is formed in the scanning area, which may deteriorate the precision of the scan angle of the laser radar system.

In view of the above, in this embodiment, timings of pulse emission of scanning laser light are controlled, based on position detection by the PSD 308 to eliminate the above drawback.

Figure 14A:
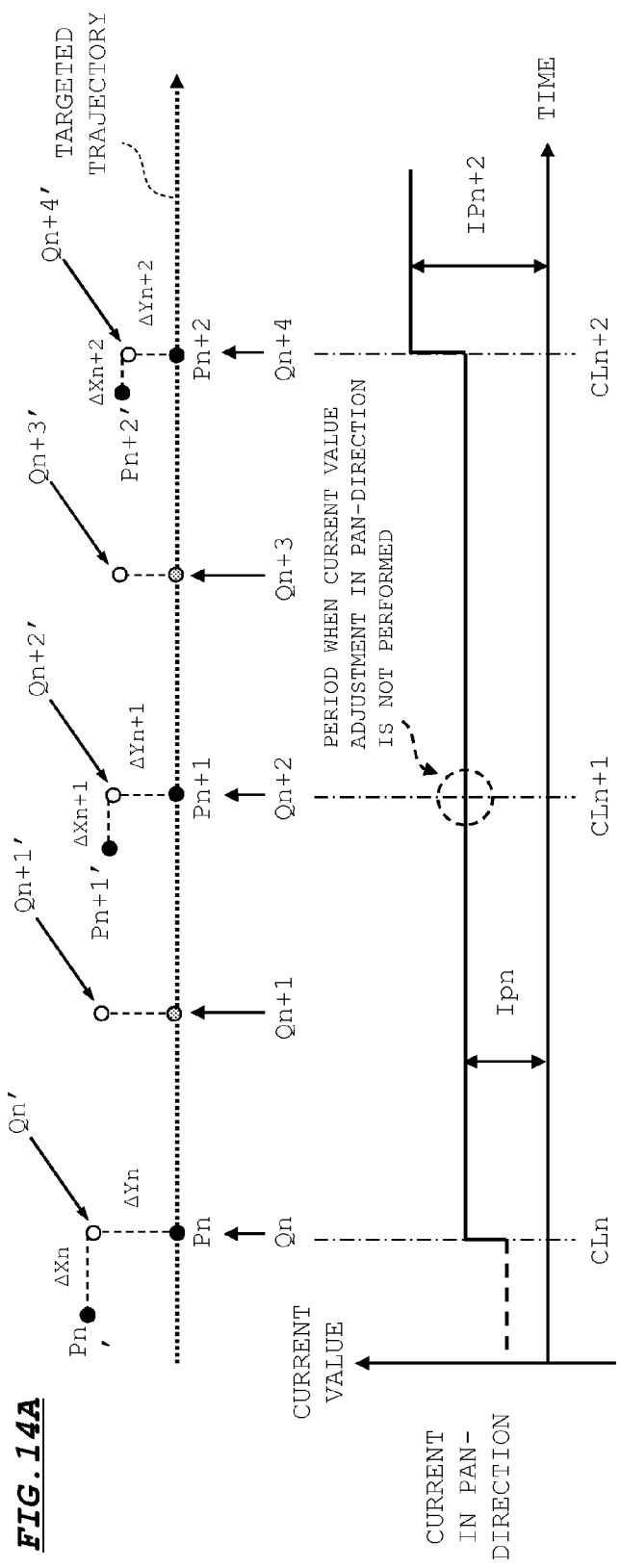
FIGS. 14A through 14C are diagrams for describing as to how the position of pulse emission is adjusted in the embodiment.

FIG. 14A is a diagram, wherein timings of pulse emission of scanning laser light are superimposed on the uppermost timing chart and the middle timing chart in FIG. 12. In FIG. 14A, Qn, Qn+1, Qn+2, Qn+3, and Qn+4 respectively represent targeted positions at which scanning laser light is pulse-emitted on a targeted trajectory defined on the PSD 308. In this example, the targeted positions Qn, Qn+1, Qn+2, Qn+3, and Qn+4 are defined at such positions that pulse emission of scanning laser light is performed in the horizontal direction at every predetermined angle. In the example shown in FIG. 14A, the emission interval of scanning laser light is set to one-half of the interval of clock timings in the trajectory table shown in FIG. 8A. Qn', Qn+1', Qn+2', Qn+3', and Qn+4' respectively represent light emission positions at which laser light is actually pulse-emitted.

Figure 14C:
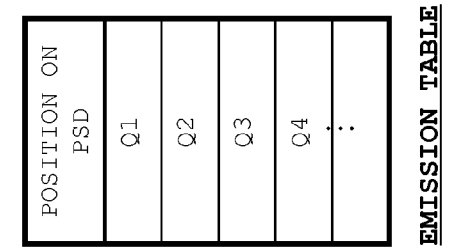

Targeted positions for pulse emission are described in an emission table shown in FIG. 14C. In the emission table, only the positions in X-axis direction (see FIG. 5A) on the light receiving surface of the PSD are described as targeted positions. The emission table is stored in a memory (not shown in FIG. 6) provided in the DSP control circuit 1.

The emission table shown in FIG. 14C is prepared individually with respect to each of the scanning zones "A", "B", and "C" shown in FIG. 10A. The emission tables are prepared based on the premise that the scanning area is allocated in the middle of the targeted area. If the scanning area is displaced from the middle of the targeted area in Pan-direction, the emission tables are corrected depending on the displacement, and the pulse emission control of scanning laser light is performed, based on the corrected emission tables.

Referring to FIG. 14A, the irradiated position of servo laser light on the light receiving surface of the PSD is shifted by the aforementioned scan-control operation as follows: Pn'→Qn'→Qn+1'→Pn+1'→Qn+2'→Qn+3'→Pn+2'→Qn+4'. During the shift operation, the scan controlling section 1a monitors the position of servo laser light in X-axis direction, as needed, based on an output signal from the PSD 308, and pulse-emits scanning laser light at a timing when the position of servo laser light in X-axis direction coincides with Qn, Qn+1, Qn+2, Qn+3, and Qn+4. Accordingly, the scanning laser light is pulse-emitted at a timing when the position of servo laser light coincides with Qn', Qn+1', Qn+2', Qn+3', and Qn+4' on an actual trajectory.

Figure 14B:
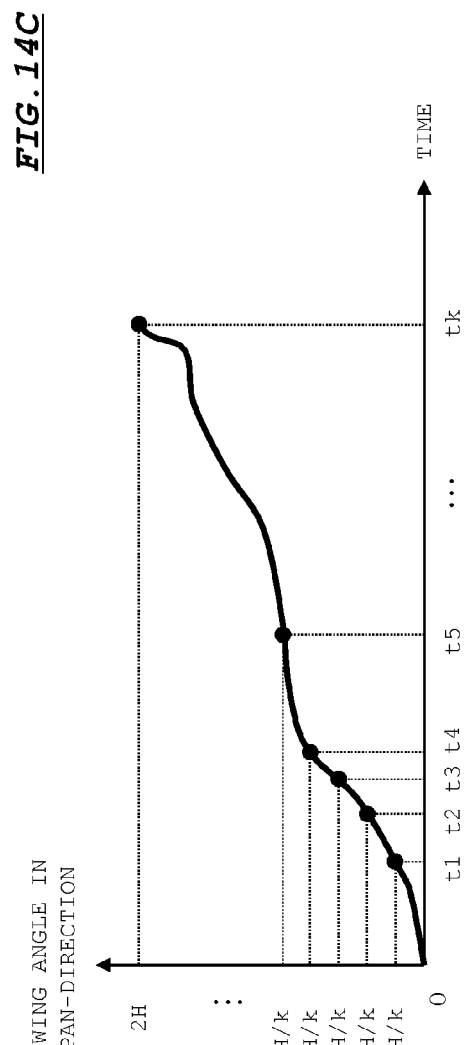

By the above emission control, scanning laser light is pulse-emitted at every predetermined swing angle in the horizontal direction. FIG. 14B is a diagram, wherein the emission timing of scanning laser light is superimposed on the schematic diagram of FIG. 13A. Referring to FIG. 14B, according to the emission control of scanning laser light in the embodiment, scanning laser light is pulse-emitted, every time the swing angle of scanning laser light in Pan-direction is changed by 2H/k. In this example, "k" corresponds to the number of targeted positions described in the emission table shown in FIG. 14C.

By the above pulse emission control, even if a scan-control operation in Pan-direction is roughly performed as shown in FIG. 12, scanning laser light is pulse-emitted in the horizontal direction at every predetermined swing angle, thereby making the emission positions in the scanning area substantially coincide with the respective corresponding positions in FIG. 11B.

As described above, according to the embodiment, even if the mirror actuator is roughly controlled in Pan-direction, scanning laser light is pulse-emitted at every predetermined swing angle. This enables to keep irradiation precision of scanning laser light in the scanning area high, while reducing the processing load of the scan controlling section.

In this embodiment, the mirror actuator is roughly controlled in Pan-direction, but is strictly controlled in Tilt-direction. This is because a displacement of scanning laser light in Tilt-direction cannot be compensated for by adjusting the emission timing of scanning laser light. In view of the above, in this embodiment, it is desirable to roughly control the mirror actuator in Pan-direction, and strictly control the mirror actuator in Tilt-direction, although the processing load of the scan controlling section 1a is increased.

In the foregoing, an embodiment of the invention has been described. The invention is not limited to the foregoing embodiment, and the embodiment of the invention may be modified in various ways other than the above.

For instance, in the embodiment, a semiconductor laser is used as a light source for servo laser light. Alternatively, an LED (Light Emitting Diode) may be used in place of the semiconductor laser.

In the embodiment, a targeted area is scanned with laser light by driving the mirror 113. Alternatively, the targeted area may be scanned with laser light by using a lens in place of the mirror 113, and by two-dimensionally driving the lens. In the modification, for instance, a light source for emitting servo laser light may be mounted on a lens holder. Further alternatively, a part of laser light after having been transmitted through a lens may be split by a beam splitter, and the split laser light may be received by a PSD as servo laser light. In the modification, however, it is necessary to provide an arrangement, wherein a laser light source emits feeble light to constantly guide servo laser light to the PSD, and the output power of the laser light source is increased to such a level that pulse light is emitted at an irradiation timing for the targeted area.

In the embodiment, the propagating direction of servo laser light is changed by using the transparent member 200. Alternatively, the propagating direction of servo laser light may be changed by mounting a mirror for servo laser light on the support shaft 112 of the mirror actuator 100, in place of the transparent member, and reflecting the servo laser light on the mirror for servo laser light. Further alternatively, a light source for emitting servo laser light may be provided on the mirror holder 110, the support shaft 111, or the support shaft 112.

In the embodiment, a scan-control operation in Pan-direction is performed at every cycle of two clock timings. Alternatively, the number of times of performing a scan-control operation in Pan-direction may be changed, as necessary, as far as scanning laser light is properly emitted. A drive-control operation of the mirror actuator 100 with respect to Pan-direction may be performed by e.g. applying a predetermined drive signal to the coil 114, without referring to a signal from the PSD 308.

Further, in the embodiment, the emission table is configured in such a manner that the emission interval of scanning laser light is set to one-half of the interval of clock timings in the trajectory table. The emission interval of scanning laser light is not limited to the above, but may be set to an interval other than the above, such as an interval equal to the interval of clock timings.

In the embodiment, the PSD 308 is used as a photodetector for receiving servo laser light. Alternatively, a four-divided PD sensor may be used in place of the PSD 308.

Figure 15:
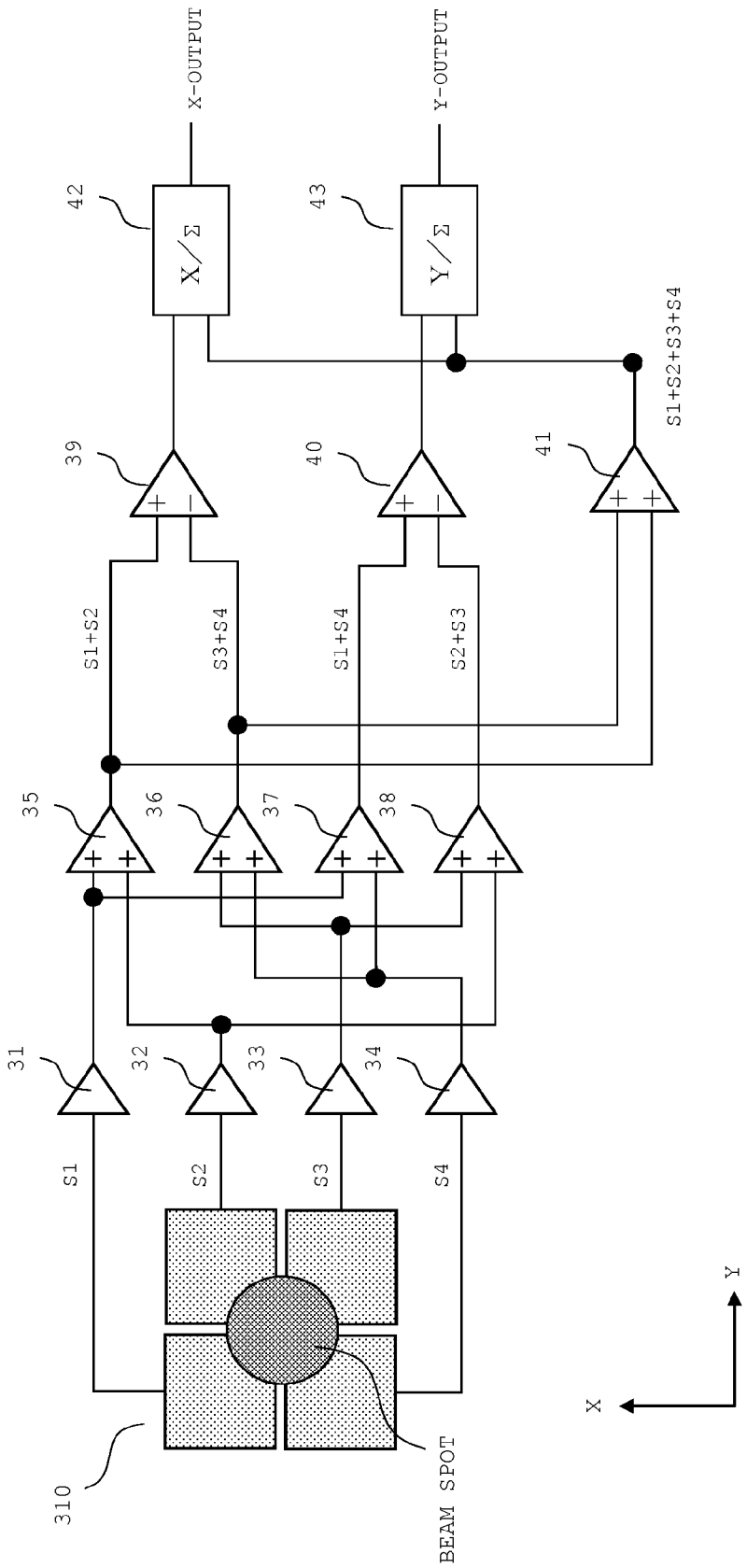
FIG. 15 is a diagram showing a modification of a photodetector in the embodiment.

FIG. 15 is a diagram showing an arrangement, in the case where a four-divided PD sensor 310 is used as a photodetector for receiving servo laser light. Servo laser light is irradiated onto a middle position of the four-divided PD sensor 310, in the case where the mirror 113 is set to a neutral position. An X-directional position and a Y-directional position of a beam spot can be calculated by e.g. the following equations (3) and (4):

$$\frac{(S1+S2)-(S3+S4)}{S1+S2+S3+S4} = x \quad (3)$$

$$\frac{(S1+S4)-(S2+S3)}{S1+S2+S3+S4} = y \quad (4)$$

where S1, S2, S3, and S4 are output signals from sensing portions of the four-divided PD sensor 310, as shown in FIG. 15.

FIG. 15 also shows an arrangement of a computation circuit for realizing the above equations (3) and (4). The signals S1, S2, S3, and S4 to be outputted from the sensing portions of the four-divided PD sensor 310 are amplified by amplifiers 31, 32, 33, and 34, respectively. Then, computations (S1+S2), (S3+S4), (S1+S4), and (S2+S3) are performed by adder circuits 35, 36, 37, and 38, respectively. Then, computations (S1+S2)−(S3+S4) and (S1+S4)−(S2+S3) are performed by subtraction circuits 39 and 40, respectively. Further, a computation (S1+S2+S3+S4) is performed by an adder circuit 41. Then, divisions as shown by the left-hand members of the equations (3) and (4) are performed by divider circuits 42 and 43, respectively. Accordingly, position detection signals indicating a light receiving position of servo laser light in X direction and Y direction are outputted from the divider circuits 42 and 43, respectively.

In the above modification, in the similar manner as shown by the arrangement in FIG. 6, signals (current values) from the sensing portions are converted into voltage values, and signals indicating a light receiving position are generated based on the voltage values after conversion by computations substantially equivalent to the foregoing computations.

The embodiment of the invention may be changed or modified in various ways as necessary, as far as such changes and modifications do not depart from the scope of the present invention hereinafter defined.

What is claimed is:

1. A beam irradiation device comprising:
a laser light source for emitting laser light;
an actuator for scanning a targeted area with the laser light;
a servo optical system which emits servo light, and changing a propagating direction of the servo light in response to driving of the actuator;
a photodetector for receiving the servo light to output a signal depending on a light receiving position of the servo light;
an actuator controlling section for controlling the actuator based on the signal to be outputted from the photodetector; and
a laser controlling section for controlling the laser light source based on the signal to be outputted from the photodetector, wherein
the laser controlling section controls the laser light source to emit the laser light in a pulse manner at a timing when the light receiving position of the servo light coincides with a predetermined targeted position.

2. The beam irradiation device according to claim 1, wherein the actuator includes
a first driving section for driving an optical element for changing the propagating direction of the laser light in a first direction corresponding to a scanning direction of the laser light in the targeted area, and
a second driving section for driving the optical element in a second direction along which a positional displacement of the laser light with respect to a scanning trajectory in the targeted area is corrected, and the actuator controlling section sets a control precision with respect to the first driving section lower than a control precision with respect to the second driving section.

3. The beam irradiation device according to claim 2, wherein
the actuator controlling section sets the number of times of control operations with respect to the first driving section for driving the optical element in the first direction smaller than the number of times of control operations with respect to the second driving section for driving the optical element in the second direction.

4. The beam irradiation device according to claim 2, wherein
the optical element is a mirror,
the first driving section pivotally rotates the mirror about a first pivotal axis, and
the second driving section pivotally rotates the mirror about a second pivotal axis perpendicular to the first pivotal axis.

5. The beam irradiation device according to claim 1, wherein
the laser controlling section includes a storing section which stores a series of the targeted positions as a table, and controls the laser light source to successively emit the laser light in a pulse manner at a timing when the light receiving position of the servo light coincides with the predetermined targeted position in the table.

6. A laser radar system comprising:
a beam irradiation device for emitting laser light onto a targeted area;
a reflected light photodetector for receiving the laser light reflected from the targeted area; and
an obstacle detecting section for detecting a status of an obstacle in the targeted area, based on a signal to be outputted from the reflected light photodetector, wherein
the beam irradiation device includes:
a laser light source for emitting the laser light;
an actuator for scanning the targeted area with the laser light;
a servo optical system for emitting servo light, and changing a propagating direction of the servo light in response to driving of the actuator;
a photodetector for receiving the servo light to output a signal depending on a light receiving position of the servo light;
an actuator controlling section for controlling the actuator based on the signal to be outputted from the photodetector; and
a laser controlling section which controls the laser light source based on the signal to be outputted from the photodetector, wherein
the laser controlling section controls the laser light source to emit the laser light in a pulse manner at a timing when the light receiving position of the servo light coincides with a predetermined targeted position.

7. The laser radar system according to claim 6, wherein the actuator includes
a first driving section for driving an optical element for changing the propagating direction of the laser light in a first direction corresponding to a scanning direction of the laser light in the targeted area, and a second driving section for driving the optical element in a second direction along which a positional displacement of the laser light with respect to a scanning trajectory in the targeted area is corrected, and the actuator controlling section sets a control precision with respect to the first driving section lower than a control precision with respect to the second driving section.

8. The laser radar system according to claim 7, wherein the actuator controlling section sets the number of times of control operations with respect to the first driving section for driving the optical element in the first direction smaller than the number of times of control operations with respect to the second driving section for driving the optical element in the second direction.

9. The laser radar system according to claim 7, wherein the optical element is a mirror, the first driving section pivotally rotates the mirror about a first pivotal axis, and the second driving section pivotally rotates the mirror about a second pivotal axis perpendicular to the first pivotal axis.

10. The laser radar system according to claim 6, wherein the laser controlling section includes a storing section for storing a series of the targeted positions as a table, and controls the laser light source to successively emit the laser light in a pulse manner at a timing when the light receiving position of the servo light coincides with the predetermined targeted position in the table.

* * * * *

UNITED STATES PATENT AND TRADEMARK OFFICE
CERTIFICATE OF CORRECTION

PATENT NO. : 8,368,874 B2
APPLICATION NO. : 12/695497
DATED : February 5, 2013
INVENTOR(S) : Yoshiaki Maeno et al.

It is certified that error appears in the above-identified patent and that said Letters Patent is hereby corrected as shown below:

On the Title Page, Item 73

Please add second Assignee -- Sanyo Optec Design Co., Ltd.
Yushima 1-chome Building, 6-3 Yushima 1-chome
Bunkyo-ku, Tokyo, Japan --

Signed and Sealed this
Thirteenth Day of May, 2014

Michelle K. Lee
*Deputy Director of the United States Patent and Trademark Office*